United States Patent
Bradford et al.

(10) Patent No.: US 8,108,654 B2
(45) Date of Patent: *Jan. 31, 2012

(54) SYSTEM AND METHOD FOR A GROUP PRIORITY ISSUE SCHEMA FOR A CASCADED PIPELINE

(75) Inventors: Jeffrey P. Bradford, Rochester, MN (US); David A. Luick, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 342 days.

This patent is subject to a terminal disclaimer.

(21) Appl. No.: 12/033,038

(22) Filed: Feb. 19, 2008

(65) Prior Publication Data

US 2009/0210665 A1 Aug. 20, 2009

(51) Int. Cl.
*G06F 9/40* (2006.01)
(52) U.S. Cl. ..................................... 712/214
(58) Field of Classification Search ........................ None
See application file for complete search history.

(56) References Cited

U.S. PATENT DOCUMENTS

| | | | |
|---|---|---|---|
| 5,430,851 A | 7/1995 | Hirata et al. | |
| 5,471,593 A | 11/1995 | Branigin | |
| 5,561,774 A | 10/1996 | Aikawa et al. | |
| 5,627,982 A | 5/1997 | Hirata et al. | |
| 5,640,588 A | 6/1997 | Vegesna et al. | |
| 5,768,610 A | 6/1998 | Pflum | |
| 5,802,386 A * | 9/1998 | Kahle et al. | 712/23 |
| 5,922,065 A | 7/1999 | Hull et al. | |
| 5,948,098 A | 9/1999 | Leung et al. | |
| 6,018,798 A | 1/2000 | Witt et al. | |
| 6,154,829 A | 11/2000 | Mino et al. | |
| 6,260,190 B1 * | 7/2001 | Ju | 717/156 |
| 6,289,445 B2 | 9/2001 | Ekner | |
| 6,338,136 B1 | 1/2002 | Col et al. | |
| 6,393,579 B1 | 5/2002 | Piazza | |
| 6,496,924 B2 | 12/2002 | Sakamoto | |
| 6,618,802 B1 * | 9/2003 | Arnold et al. | 712/219 |
| 6,862,677 B1 | 3/2005 | Stravers | |
| 6,912,648 B2 | 6/2005 | Hammarlund et al. | |
| 7,222,227 B2 | 5/2007 | Katayama et al. | |
| 7,281,119 B1 | 10/2007 | Cofler et al. | |
| 7,308,562 B2 | 12/2007 | Haugh | |

(Continued)

OTHER PUBLICATIONS

U.S. Appl. No. 12/033,047 Non-Final Office Action dated May 3, 2010.

(Continued)

*Primary Examiner* — Eddie P Chan
*Assistant Examiner* — John Lindlof
(74) *Attorney, Agent, or Firm* — Cantor Colburn LLP

(57) ABSTRACT

The present invention provides system and method for a group priority issue schema for a cascaded pipeline. The system includes a cascaded delayed execution pipeline unit having a plurality of execution pipelines that execute instructions in a common issue group in a delayed manner relative to each other. The system further includes circuitry configured to receiving an issue group of instructions, reordering the issue group of instructions using instruction type priority, and executing the reordered issue group of instructions in the cascaded delayed execution pipeline unit. The method, among others, can be broadly summarized by the following steps: receiving an issue group of instructions, reordering the issue group of instructions using instruction type priority, and executing the reordered issue group of instructions in the cascaded delayed execution pipeline unit.

20 Claims, 7 Drawing Sheets

U.S. PATENT DOCUMENTS

| | | | |
|---|---|---|---|
| 7,363,467 | B2 | 4/2008 | Vajapeyam et al. |
| 2002/0169942 | A1 | 11/2002 | Sugimoto |
| 2003/0126408 | A1 | 7/2003 | Vajapeyam et al. |
| 2003/0131030 | A1* | 7/2003 | Sebot et al. ............. 708/209 |
| 2003/0177338 | A1 | 9/2003 | Luick |
| 2003/0182534 | A1 | 9/2003 | Harthcock |
| 2004/0059891 | A1 | 3/2004 | Luick |
| 2004/0073753 | A1 | 4/2004 | Luick |
| 2004/0083468 | A1* | 4/2004 | Ogawa et al. ............. 717/151 |
| 2004/0103336 | A1 | 5/2004 | Flores et al. |
| 2004/0154006 | A1 | 8/2004 | Heishi et al. |
| 2004/0181651 | A1 | 9/2004 | Sugumar et al. |
| 2005/0114856 | A1 | 5/2005 | Eickemeyer et al. |
| 2005/0166038 | A1 | 7/2005 | Wang et al. |
| 2006/0090061 | A1 | 4/2006 | Akkary et al. |
| 2006/0101241 | A1 | 5/2006 | Curran et al. |
| 2006/0168583 | A1 | 7/2006 | Basso et al. |
| 2006/0179280 | A1 | 8/2006 | Jensen et al. |
| 2007/0011434 | A1 | 1/2007 | Luick |
| 2007/0067608 | A1 | 3/2007 | Lofgren et al. |
| 2007/0143581 | A1 | 6/2007 | Mansell |
| 2007/0186073 | A1 | 8/2007 | Luick |
| 2007/0186080 | A1 | 8/2007 | Luick |
| 2007/0288725 | A1 | 12/2007 | Luick |
| 2008/0162890 | A1 | 7/2008 | Sathaye |
| 2009/0031120 | A1 | 1/2009 | Vaden |
| 2009/0210666 | A1 | 8/2009 | Luick |
| 2009/0210667 | A1 | 8/2009 | Luick |
| 2009/0210668 | A1 | 8/2009 | Luick |
| 2009/0210669 | A1 | 8/2009 | Luick |
| 2009/0210670 | A1 | 8/2009 | Luick |
| 2009/0210671 | A1 | 8/2009 | Luick |
| 2009/0210672 | A1 | 8/2009 | Luick |
| 2009/0210673 | A1 | 8/2009 | Luick |
| 2009/0210674 | A1 | 8/2009 | Luick |
| 2009/0210676 | A1 | 8/2009 | Luick |
| 2009/0210677 | A1 | 8/2009 | Luick |
| 2009/0240919 | A1 | 9/2009 | Alexander et al. |

OTHER PUBLICATIONS

U.S. Appl. No. 12/033,100 Non-Final Office Action dated May 3, 2010.

U.S. Appl. No. 12/033,111 Non-Final Office Action dated May 3, 2010.

U.S. Appl. No. 12/033,052 Notice of Allowance dated Aug. 25, 2010.

U.S. Appl. No. 12/033,034 Non-Final Office Action dated Jun. 1, 2010.

U.S. Appl. No. 12/033,043 Non-Final Office Action dated Jun. 1, 2010.

U.S. Appl. No. 12/033,045 Non-Final Office Action dated Jun. 4, 2010.

U.S. Appl. No. 12/033,047; Final Office Action; Date Mailed: Sep. 16, 2010.

U.S. Appl. No. 12/033,085; Notice of Allowance; Date Mailed: Sep. 22, 2010.

U.S. Appl. No. 12/033,100; Final Office Action; Date Mailed: Sep. 14, 2010.

U.S. Appl. No. 12/033,122; Notice of Allowance; Date Mailed: Sep. 20, 2010.

U.S. Appl. No. 12/033,127; Notice of Allowance; Date Mailed: Sep. 1, 2010.

U.S. Appl. No. 12/033,140; Final Office Action; Date Mailed: Sep. 2, 2010.

Jianghua Wan & Shuming Chen, "Reducing Conflicts in SMT VLIW Processor for Higher Throughput," Dec. 2005, 7 pgs; Embedded Software and Systems, Second International Conference, IEEE.

U.S. Appl. No. 12/033,034; Final Office Action; filed Feb. 19, 2008; Date Mailed: Oct. 25, 2010.

U.S. Appl. No. 12/033,043; Final Office Action; filed Feb. 19, 2008; Date Mailed: Oct. 25, 2010.

U.S. Appl. No. 12/033,045; Final Office Action; filed Feb. 19, 2008; Date Mailed: Oct. 25, 2010.

U.S. Appl. No. 12/033,111; Final Office Action; filed Feb. 19, 2008; Date Mailed: Oct. 13, 2010.

U.S. Appl. No. 12/033,100; Notice of Allowance; filed Feb. 19, 2008; Date Mailed: Mar. 30, 2011.

U.S. Appl. No. 12/033,034; Non-Final Office Action; filed Feb. 19, 2008; Date Mailed: Apr. 14, 2011.

U.S. Appl. No. 12/033,047; Notice of Allowance; filed Feb. 19, 2008; Date Mailed: Feb. 24, 2011.

U.S. Appl. No. 12/033,140; Non-Final Office Action; filed Feb. 19, 2008; Date Mailed: Feb. 23, 2011.

U.S. Appl. No. 12/033,140; Final Office Action; filed Feb. 19, 2008; Date Mailed; Aug. 1, 2011.

* cited by examiner

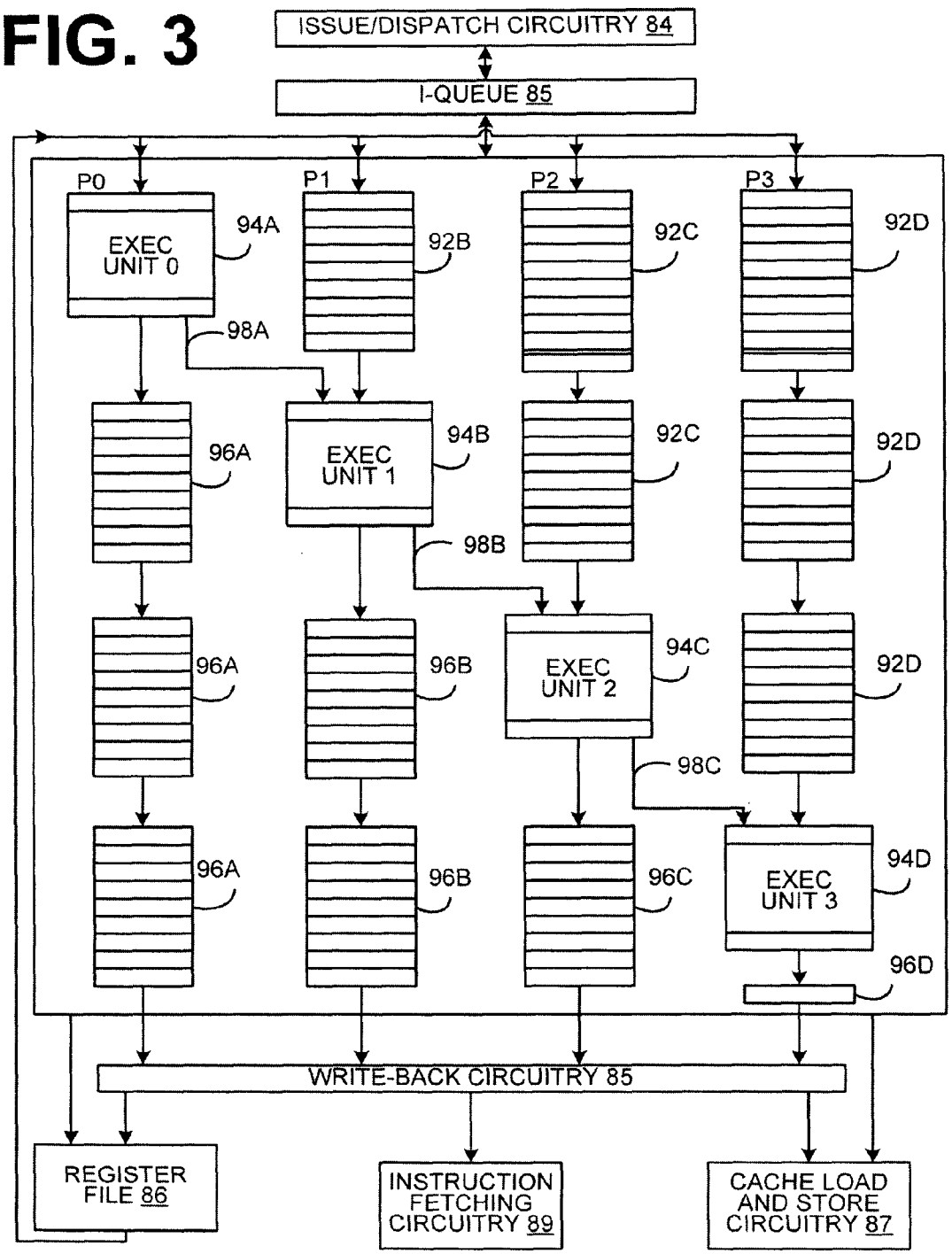

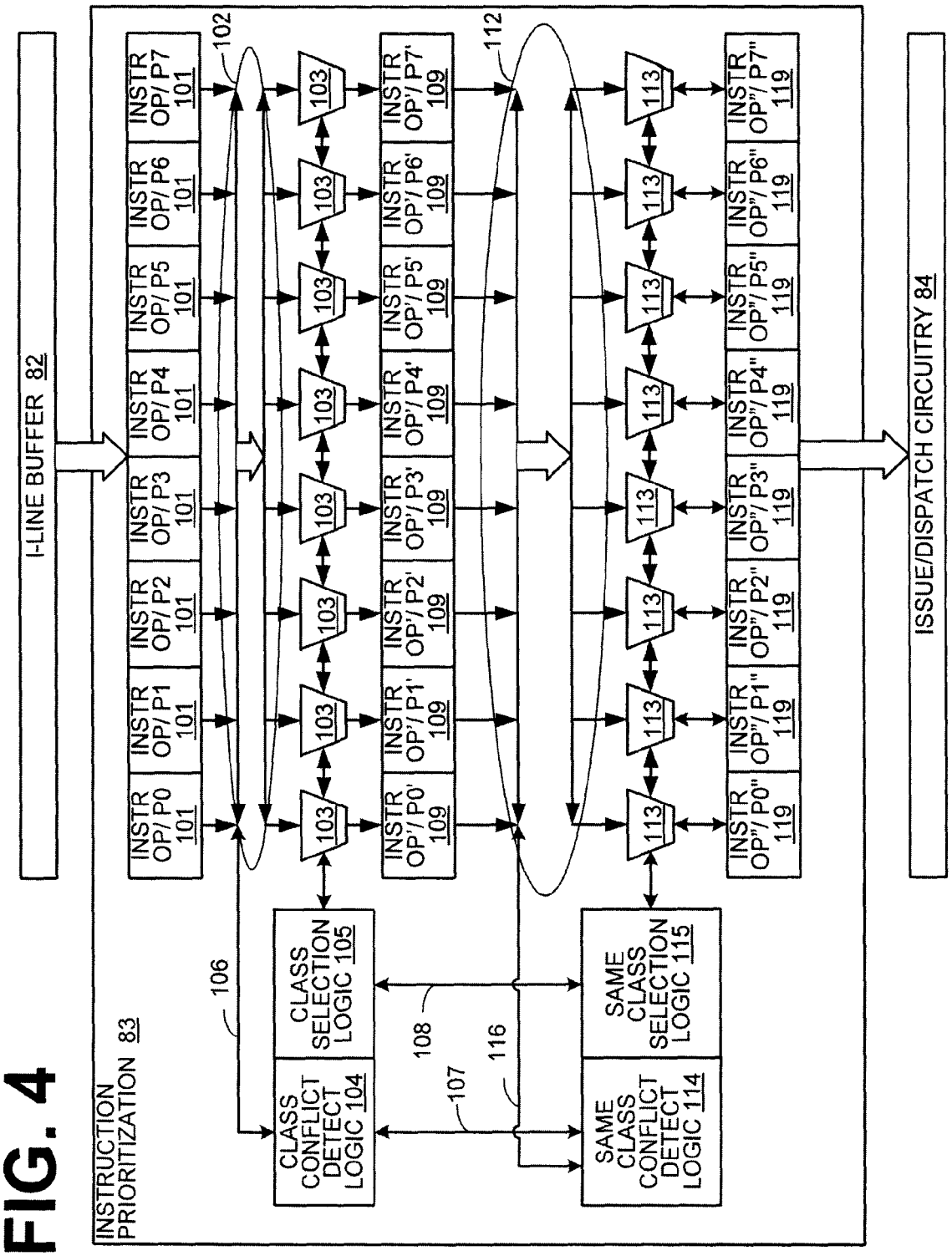

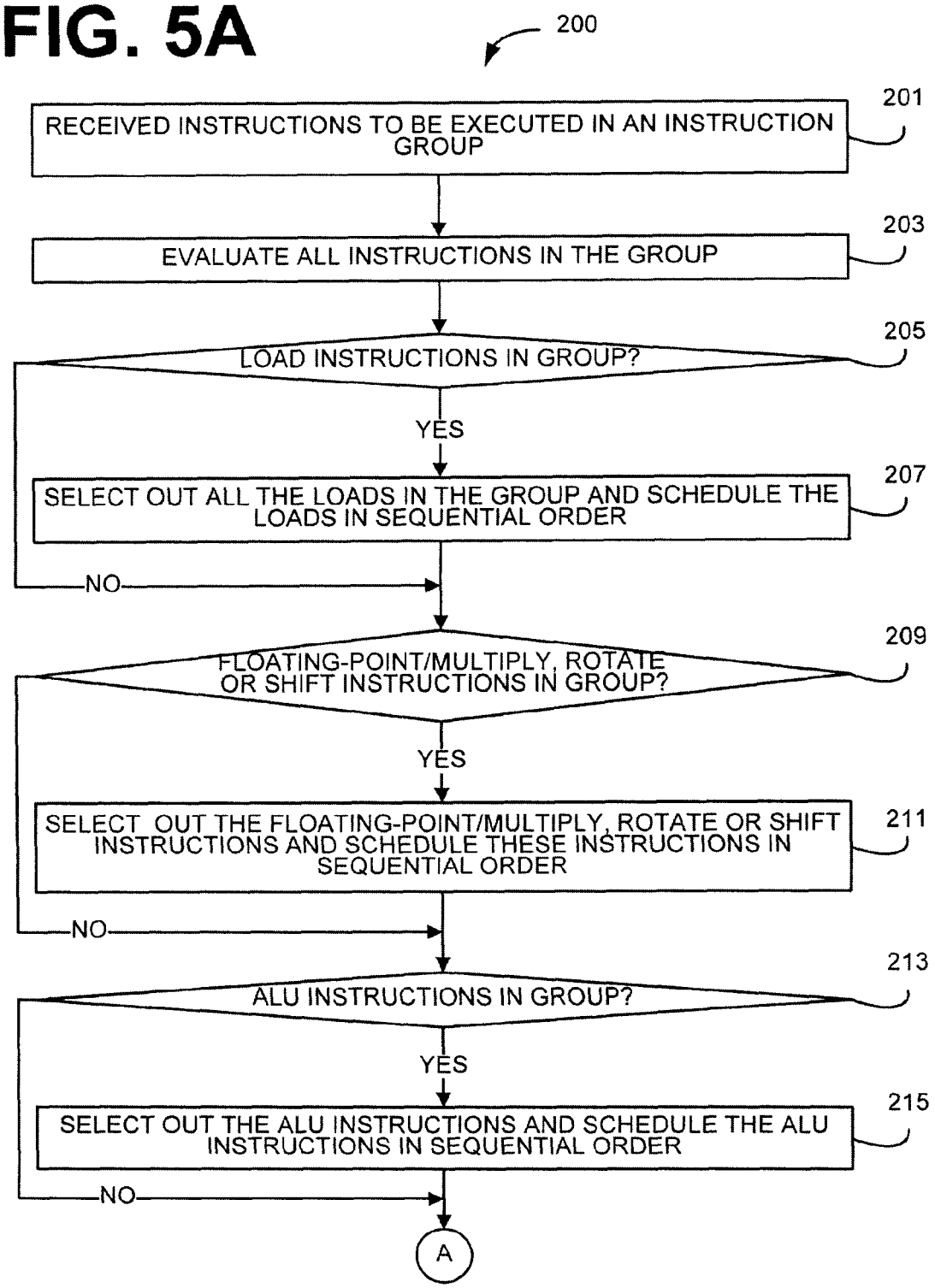

SYSTEM AND METHOD FOR A GROUP PRIORITY ISSUE SCHEMA FOR A CASCADED PIPELINE

CROSS-REFERENCE TO RELATED APPLICATION

This application is related to the following co-pending applications: Ser. Nos. 12/033,034, 12/033,043, 12/033,045, 12/033,047, 12/033,052, 12/033,085, 12/033,100, 12/033,111, 12/033,122, 12/033,127, and 12/033,140, all filed on Feb. 19, 2008, and assigned to the assignee of the present application, the contents of which are incorporated herein by reference in their entirety.

BACKGROUND OF THE INVENTION

1. Field of the Invention

The present invention generally relates to executing instructions in a processor. Specifically, this application is related to a class group priority issue schema for a cascaded pipeline.

2. Description of Background

Currently, modern computer systems typically contain several integrated circuits (ICs), including a processor which may be used to process information in the computer system. The data processed by a processor may include computer instructions which are executed by the processor as well as data which is manipulated by the processor using the computer instructions. The computer instructions and data are typically stored in a main memory in the computer system.

Processors typically process instructions by executing the instruction in a series of small steps. In some cases, to increase the number of instructions being processed by the processor (and therefore increase the speed of the processor), the processor may be pipelined. Pipelining refers to providing separate stages in a processor where each stage performs one or more of the small steps necessary to execute an instruction. In some cases, the pipeline (in addition to other circuitry) may be placed in a portion of the processor referred to as the processor core. Some processors may have multiple processor cores, and in some cases, each processor core may have multiple pipelines. Where a processor core has multiple pipelines, groups of instructions (referred to as issue groups) may be issued to the multiple pipelines in parallel and executed by each of the pipelines in parallel.

As an example of executing instructions in a pipeline, when a first instruction is received, a first pipeline stage may process a small part of the instruction. When the first pipeline stage has finished processing the small part of the instruction, a second pipeline stage may begin processing another small part of the first instruction while the first pipeline stage receives and begins processing a small part of a second instruction. Thus, the processor may process two or more instructions at the same time (in parallel).

To provide for faster access to data and instructions as well as better utilization of the processor, the processor may have several caches. A cache is a memory which is typically smaller than the main memory and is typically manufactured on the same die (i.e., chip) as the processor. Modern processors typically have several levels of caches. The fastest cache which is located closest to the core of the processor is referred to as the Level 1 cache (L1 cache). In addition to the L1 cache, the processor typically has a second, larger cache, referred to as the Level 2. Cache (L2 cache). In some cases, the processor may have other, additional cache levels (e.g., an L3 cache and an L4 cache).

To provide the processor with enough instructions to fill each stage of the processor's pipeline, the processor may retrieve instructions from the L2 cache in a group containing multiple instructions, referred to as an instruction line (I-line). The retrieved I-line may be placed in the L1 instruction cache (I-cache) where the core of the processor may access instructions in the I-line. Blocks of data (D-lines) to be processed by the processor may similarly be retrieved from the L2 cache and placed in the L1 cache data cache (D-cache).

The process of retrieving information from higher cache levels and placing the information in lower cache levels may be referred to as fetching, and typically requires a certain amount of time (latency). For instance, if the processor core requests information and the information is not in the L1 cache (referred to as a cache miss), the information may be fetched from the L2 cache. Each cache miss results in additional latency as the next cache/memory level is searched for the requested information. For example, if the requested information is not in the L2 cache, the processor may look for the information in an L3 cache or in main memory.

In some cases, a processor may process instructions and data faster than the instructions and data are retrieved from the caches and/or memory. For example, where an instruction being executed in a pipeline attempts to access data which is not in the D-cache, pipeline stages may finish processing previous instructions while the processor is fetching a D-line which contains the data from higher levels of cache or memory. When the pipeline finishes processing the previous instructions while waiting for the appropriate D-line to be fetched, the pipeline may have no instructions left to process (referred to as a pipeline stall). When the pipeline stalls, the processor is underutilized and loses the benefit that a pipelined processor core provides.

Because the address of the desired data may not be known until the instruction is executed, the processor may not be able to search for the desired D-line until the instruction is executed. However, some processors may attempt to prevent such cache misses by fetching a block of D-lines which contain data addresses near (contiguous to) a data address which is currently being accessed. Fetching nearby D-lines relies on the assumption that when a data address in a D-line is accessed, nearby data addresses will likely also be accessed as well (this concept is generally referred to as locality of reference). However, in some cases, the assumption may prove incorrect, such that data in D-lines which are not located near the current D-line are accessed by an instruction, thereby resulting in a cache miss and processor inefficiency.

Accordingly, there is a need for improved methods and apparatus for executing instructions and retrieving data in a processor which utilizes cached memory.

SUMMARY OF THE INVENTION

Embodiments of the present invention provide a system and method for a class group priority issue schema for a cascaded pipeline. Briefly described, in architecture, one embodiment of the system, among others, can be implemented as follows.

The system includes a cascaded delayed execution pipeline unit having a plurality of execution pipelines that execute instructions in a common issue group in a delayed manner relative to each other. The system further includes circuitry configured to: (1) receive an issue group of instructions; (2) reorder the issue group of instructions using instruction type priority; and (5) execute the reordered issue group of instructions in the cascaded delayed execution pipeline unit.

Embodiments of the present invention can also be viewed as providing methods for providing a group priority issue schema for a cascaded pipeline. In this regard, one embodiment of such a method, among others, can be broadly summarized by the following steps. The method of scheduling execution of an instruction in a processor having at least one cascaded delayed execution pipeline unit having four or more execution pipelines that execute instructions in a common issue group in a delayed manner relative to each other. The method further includes (1) receiving an issue group of instructions; (2) determining if at least one load instruction is in the issue group, if so scheduling the at least one load instruction in a pipeline; (3) determining if at least one floating point instruction is in the issue group, if so the floating point instruction is scheduled in a next available pipeline; (4) determining if at least one ALU instruction is in the issue group, if so, the at least one ALU instruction is scheduled in the available pipeline; and (5) executing the issue group of instructions in the cascaded delayed execution pipeline unit.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 3 is a block diagram depicting one of the cores of the processor according to one embodiment of the invention.

FIG. 4 is a block diagram depicting an instruction prioritization circuitry according to one embodiment of the invention.

FIGS. 5A-C is a flow chart illustrating an example of the operation of a group priority issue process for executing instructions in the delayed execution pipeline according to one embodiment of the invention.

Figure 1:
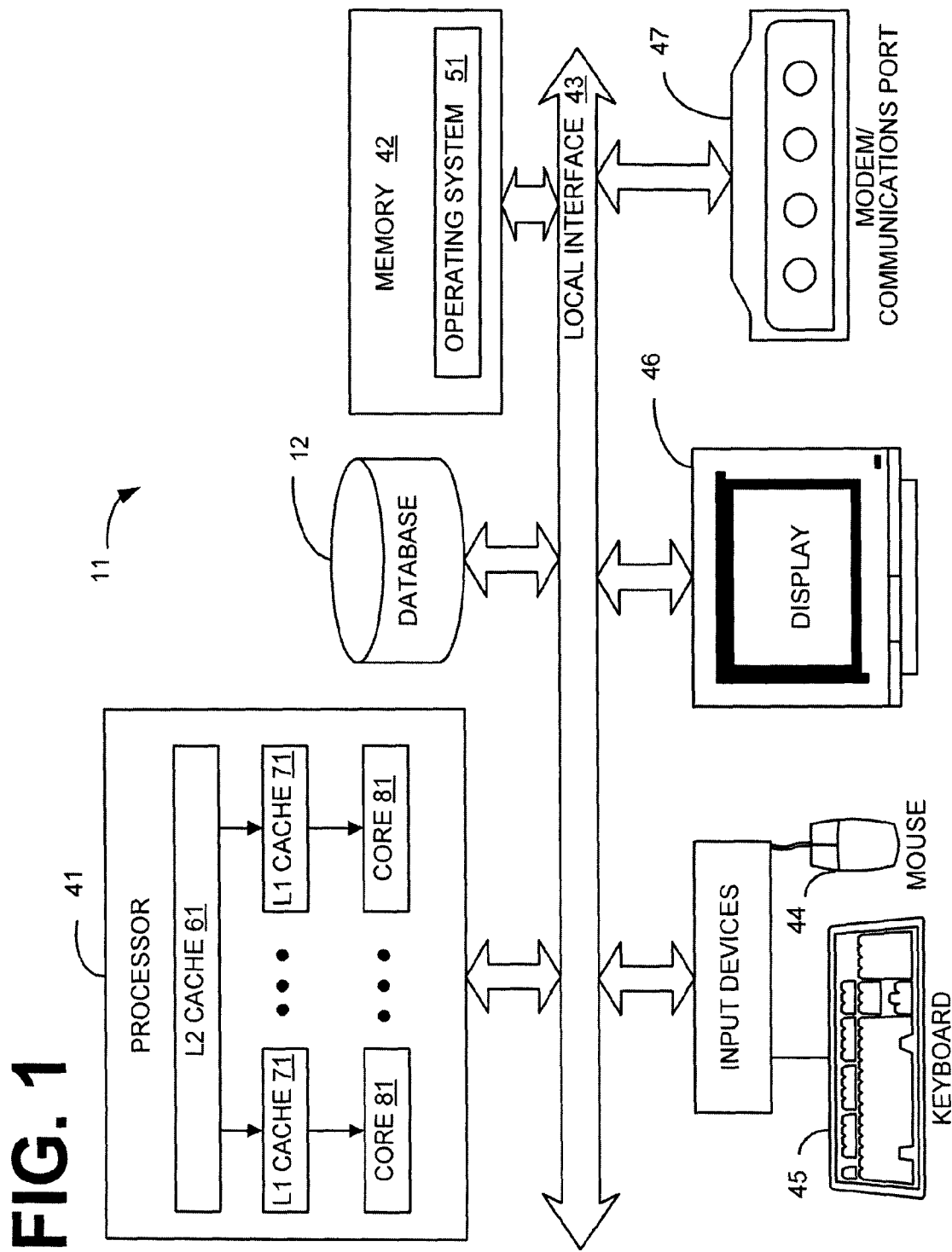
FIG. 1 is a block diagram depicting a system according to one embodiment of the invention.

The detailed description explains the preferred embodiments of the invention, together with advantages and features, by way of example with reference to the drawings.

DETAILED DESCRIPTION OF THE INVENTION

For cascaded delayed pipeline issue, instructions are in general assigned to the leftmost possible delayed pipeline that will cause zero instruction execution bubbles; loads have the highest priority for this assignment, then arithmetic instructions (ALU and MAD ops) are the next priority. Stores, branches, and compares are assigned last and in general may be assigned to any delayed pipeline without loss of performance. Sometimes, multiple load instructions (or multiple arithmetic instructions) will want to be assigned to the same delayed pipeline. In this disclosure, a second level priority scheme is invoked which ranks various types of loads/load attributes into a number of categories, typically eight.

The load priorities include parameters such as a cache missing load (highest priority), a load with a long dependency chain following (next highest priority), followed by other moderate priority indications; and, lastly, lowest priority loads which are defined as being end of dependent chain loads or nearly end of dependent chain loads. So, based on this priority, lower priority loads will be assigned to a more delayed pipeline than the original zero bubble method had determined. But also, cases exist where two similar high priority loads want to be naively assigned to the same leftmost possible pipeline but the second of these two loads will alternatively be scheduled in the next instruction group with the current instruction group terminated.

The present invention generally provides a mechanism and method for a priority scheme which ranks various types of loads/load attributes into a number of categories. In one embodiment, a method of scheduling execution of an instruction in a processor is provided. The processor may have at least one cascaded delayed execution pipeline unit having two or more execution pipelines that execute instructions in a common issue group in a delayed manner relative to each other. By executing the instruction in the delayed execution pipeline, and by initiating the L2 cache access when the instruction is issued, the data targeted by the instruction may be retrieved, if necessary, from the L2 cache in time for the instruction to use the data without stalling execution of the instruction.

A method includes receiving an issue group of instructions, separating the instructions by relative priority (e.g., loads are highest priority, then ALU ops, then stores and compares, lastly branches). So, all possible loads are picked out and run first. This is done by putting them in the left most pipes as possible. Then ALU ops are grouped next, and assign to leftward pipes that are not otherwise occupied. Stores and most branches can be put in any remaining pipes. The apparatus and method to implement this optimization within a group priority issue scheme for cascaded pipelines are described in commonly assigned and co-pending application Ser. No. 12/033,034, listed above.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in the claim(s). Likewise, reference to "the invention" shall not be construed as a generalization of any inventive subject matter disclosed herein and shall not be considered to be an element or limitation of the appended claims except where explicitly recited in a claim(s).

The following is a detailed description of embodiments of the invention depicted in the accompanying drawings. The embodiments are examples and are in such detail as to clearly communicate the invention. However, the amount of detail offered is not intended to limit the anticipated variations of embodiments; but on the contrary, the intention is to cover all modifications, equivalents, and alternatives falling within the spirit and scope of the present invention as defined by the appended claims.

Embodiments of the invention may be utilized with and are described below with respect to a system, e.g., a computer system. As used herein, a system may include any system utilizing a processor and a cache memory, including a personal computer, internet appliance, digital media appliance, portable digital assistant (PDA), portable music/video player and video game console. While cache memories may be located on the same die as the processor which utilizes the cache memory, in some cases, the processor and cache memories may be located on different dies (e.g., separate chips within separate modules or separate chips within a single module).

While described below with respect to a processor having multiple processor cores and multiple L1 caches, wherein each processor core uses multiple pipelines to execute instructions, embodiments of the invention may be utilized with any processor which utilizes a cache, including processors which have a single processing core. In general, embodiments of the invention may be utilized with any processor and are not limited to any specific configuration. Furthermore, while described below with respect to a processor having an L1-cache divided into an L1 instruction cache (L1 I-cache, or I-cache) and an L1 data cache (L1 D-cache, or D-cache), embodiments of the invention may be utilized in configurations wherein a unified L1 cache is utilized.

FIG. 1 is a block diagram illustrating an example of a computer 11 utilizing the group priority issue process 200 of the present invention. Computer 11 includes, but is not limited to, PCs, workstations, laptops, PDAs, palm devices and the like. Generally, in terms of hardware architecture, as shown in FIG. 1, the computer 11 include a processor 41, memory 42, and one or more input and/or output (I/O) devices (or peripherals) that are communicatively coupled via a local interface 43. The local interface 43 can be, for example but not limited to, one or more buses or other wired or wireless connections, as is known in the art. The local interface 43 may have additional elements, which are omitted for simplicity, such as controllers, buffers (caches), drivers, repeaters, and receivers, to enable communications. Further, the local interface 43 may include address, control, and/or data connections to enable appropriate communications among the aforementioned components.

The processor 41 is a hardware device for executing software that can be stored in memory 42. The processor 41 can be virtually any custom made or commercially available processor, a central processing unit (CPU), data signal processor (DSP) or an auxiliary processor among several processors associated with the computer 11, and a semiconductor based microprocessor (in the form of a microchip) or a macroprocessor. Examples of suitable commercially available microprocessors are as follows: a PowerPC microprocessor from IBM, U.S.A., an 80x86 or Pentium series microprocessor from Intel Corporation, U.S.A., a Sparc microprocessor from Sun Microsystems, Inc, a PA-RISC series microprocessor from Hewlett-Packard Company, U.S.A., or a 68xxx series microprocessor from Motorola Corporation, U.S.A.

The memory 42 can include any one or combination of volatile memory elements (e.g., random access memory (RAM, such as dynamic random access memory (DRAM), static random access memory (SRAM), etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 42 may incorporate electronic, magnetic, optical, and/or other types of storage media. Note that the memory 42 can have a distributed architecture, where various components are situated remote from one another, but can be accessed by the processor 41.

The software in memory 42 may include one or more separate programs, each of which comprises an ordered listing of executable instructions for implementing logical functions. In the example illustrated in FIG. 1, the software in the memory 42 includes a suitable operating system (O/S) 51. The operating system 51 essentially controls the execution of other computer programs, and provides scheduling, input-output control, file and data management, memory management, and communication control and related services.

A non-exhaustive list of examples of suitable commercially available operating systems 51 is as follows (a) a Windows operating system available from Microsoft Corporation; (b) a Netware operating system available from Novell, Inc.; (c) a Macintosh operating system available from Apple Computer, Inc.; (e) a UNIX operating system, which is available for purchase from many vendors, such as the Hewlett-Packard Company, Sun Microsystems, Inc., and AT&T Corporation; (d) a Linux operating system, which is freeware that is readily available on the Internet; (e) a run time Vxworks operating system from WindRiver Systems, Inc.; or (f) an appliance-based operating system, such as that implemented in handheld computers or personal data assistants (PDAs) (e.g., Symbian OS available from Symbian, Inc., PalmOS available from Palm Computing, Inc., and Windows CE available from Microsoft Corporation).

The I/O devices may include input devices, for example but not limited to, a mouse 44, keyboard 45, scanner (not shown), microphone (not shown), etc. Furthermore, the I/O devices may also include output devices, for example but not limited to, a printer (not shown), display 46, etc. Finally, the I/O devices may further include devices that communicate both inputs and outputs, for instance but not limited to, a NIC or modulator/demodulator 47 (for accessing remote devices, other files, devices, systems, or a network), a radio frequency (RF) or other transceiver (not shown), a telephonic interface (not shown), a bridge (not shown), a router (not shown), etc.

If the computer 11 is a PC, workstation, intelligent device or the like, the software in the memory 42 may further include a basic input output system (BIOS) (omitted for simplicity). The BIOS is a set of essential software routines that initialize and test hardware at startup, start the O/S 51, and support the transfer of data among the hardware devices. The BIOS is stored in some type of read-only-memory, such as ROM, PROM, EPROM, EEPROM or the like, so that the BIOS can be executed when the computer 11 is activated.

When the computer 11 is in operation, the processor 41 is configured to execute software stored within the memory 42, to communicate data to and from the memory 42, and to generally control operations of the computer 11 are pursuant to the software. The O/S 51 and any other program are read, in whole or in part, by the processor 41, perhaps buffered within the processor 41, and then executed.

According to one embodiment of the invention, the processor 41 may have an L2 cache 61 as well as multiple L1 caches 71, with each L1 cache 71 being utilized by one of multiple processor cores 81. According to one embodiment, each processor core 81 may be pipelined, wherein each instruction is performed in a series of small steps with each step being performed by a different pipeline stage.

Figure 2:
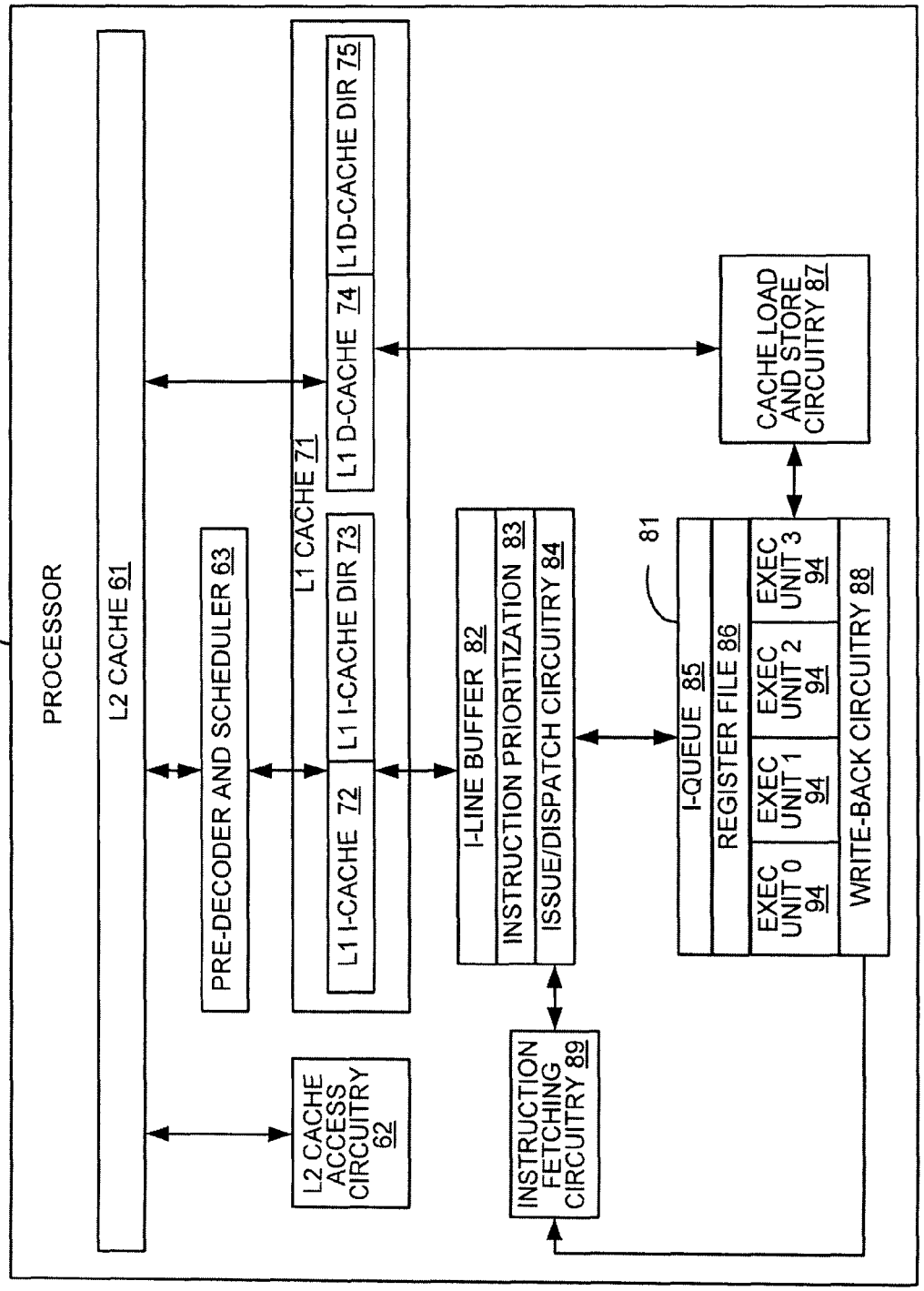
FIG. 2 is a block diagram depicting a computer processor according to one embodiment of the invention.

FIG. 2 is a block diagram depicting a processor 41 according to one embodiment of the invention. For simplicity, FIG. 2 depicts and is described with respect to a single processor core 81 of the processor 41. In one embodiment, each processor core 81 may be identical (e.g., contain identical pipelines with identical pipeline stages). In another embodiment, each processor core 81 may be different (e.g., contain different pipelines with different stages).

In one embodiment of the invention, the L2 cache may contain a portion of the instructions and data being used by the processor 41. In some cases, the processor 41 may request instructions and data which are not contained in the L2 cache 61. Where requested instructions and data are not contained in the L2 cache 61, the requested instructions and data may be retrieved (either from a higher level cache or system memory 42) and placed in the L2 cache. When the processor core 81 requests instructions from the L2 cache 61, the instructions may be first processed by a predecoder and scheduler 63 (described below in greater detail).

In one embodiment of the invention, instructions may be fetched from the L2 cache 61 in groups, referred to as I-lines. Similarly, data may be fetched from the L2 cache 61 in groups referred to as D-lines. The L1 cache 71 depicted in FIG. 1 may be divided into two parts, an L1 instruction cache 72 (L1 I-cache 72) for storing I-lines as well as an L1 data cache 74 (D-cache 74) for storing D-lines. I-lines and D-lines may be fetched from the L2 cache 61 using L2 access circuitry 62.

In one embodiment of the invention, I-lines retrieved from the L2 cache 61 may be processed by a predecoder and scheduler 63 and the I-lines may be placed in the L1 I-cache 72. To further improve processor performance, instructions are often predecoded, for example, I-lines are retrieved from L2 (or higher) cache. Such predecoding may include various functions, such as address generation, branch prediction, and scheduling (determining an order in which the instructions should be issued), which is captured as dispatch information (a set of flags) that control instruction execution. In some cases, the predecoder and scheduler 63 may be shared among multiple processor cores 81 and L1 caches. Similarly, D-lines fetched from the L2 cache 61 may be placed in the D-cache 74. A bit in each I-line and D-line may be used to track whether a line of information in the L2 cache 61 is an I-line or D-line. Optionally, instead of fetching data from the L2 cache 61 in I-lines and/or D-lines, data may be fetched from the L2 cache 61 in other manners, e.g., by fetching smaller, larger, or variable amounts of data.

In one embodiment, the L1 I-cache 72 and D-cache 74 may have an I-cache directory 73 and D-cache directory 75 respectively to track which I-lines and D-lines are currently in the L1 I-cache 72 and D-cache 74. When an I-line or D-line is added to the L1 I-cache 72 or D-cache 74, a corresponding entry may be placed in the I-cache directory 73 or D-cache directory 75. When an I-line or D-line is removed from the L1 I-cache 72 or D-cache 74, the corresponding entry in the I-cache directory 73 or D-cache directory 75 may be removed. While described below with respect to a D-cache 74 which utilizes a D-cache directory 75, embodiments of the invention may also be utilized where a D-cache directory 75 is not utilized. In such cases, the data stored in the D-cache 74 itself may indicate what D-lines are present in the D-cache 74.

In one embodiment, instruction fetching circuitry 89 may be used to fetch instructions for the processor core 81. For example, the instruction fetching circuitry 89 may contain a program counter which tracks the current instructions being executed in the core. A branch unit within the core may be used to change the program counter when a branch instruction is encountered. An I-line buffer 82 may be used to store instructions fetched from the L1 I-cache 72. Issue and dispatch circuitry 84 maybe used to group instructions retrieved from the I-line buffer 82 into instruction groups which may then be issued in parallel to the processor core 81 as described below. In some cases, the issue and dispatch circuitry may use information provided by the predecoder and scheduler 63 to form appropriate instruction groups.

In addition to receiving instructions from the issue and dispatch circuitry 84, the processor core 81 may receive data from a variety of locations. Where the processor core 81 requires data from a data register, a register file 86 may be used to obtain data. Where the processor core 81 requires data from a memory location, cache load and store circuitry 87 may be used to load data from the D-cache 74. Where such a load is performed, a request for the required data may be issued to the D-cache 74. At the same time, the D-cache directory 75 may be checked to determine whether the desired data is located in the D-cache 74. Where the D-cache 74 contains the desired data, the D-cache directory 75 may indicate that the D-cache 74 contains the desired data and the D-cache access may be completed at some time afterwards. Where the D-cache 74 does not contain the desired data, the D-cache directory 75 may indicate that the D-cache 74 does not contain the desired data. Because the D-cache directory 75 may be accessed more quickly than the D-cache 74, a request for the desired data may be issued to the L2 cache 61 (e.g., using the L2 access circuitry 62) after the D-cache directory 75 is accessed but before the D-cache access is completed.

In some cases, data may be modified in the processor core 81. Modified data may be written to the register file 86, or stored in memory 42 (FIG. 1). Write-back circuitry 85 may be used to write data back to the register file 86. In some cases, the write-back circuitry 85 may utilize the cache load and store circuitry 87 to write data back to the D-cache 74. Optionally, the processor core 81 may access the cache load and store circuitry 87 directly to perform stores. In some cases, as described below, the write-back circuitry 85 may also be used to write instructions back to the L1 I-cache 72.

As described above, the issue and dispatch circuitry 84 may be used to form instruction groups and issue the formed instruction groups to the processor core 81. The issue and dispatch circuitry 84 may also include circuitry to rotate and merge instructions in the I-line and thereby form an appropriate instruction group. Formation of issue groups may take into account several considerations, such as dependencies between the instructions in an issue group as well as optimizations which may be achieved from the ordering of instructions as described in greater detail below with regard to FIGS. 4A-4B. Once an issue group is formed, the issue group may be dispatched in parallel to the processor core 81. In some cases, an instruction group may contain one instruction for each pipeline in the processor core 81. Optionally, the instruction group may a smaller number of instructions.

According to one embodiment of the invention, one or more processor cores 81 may utilize a cascaded, delayed execution pipeline configuration. In the example depicted in FIG. 3, the processor core 81 contains four pipelines in a cascaded configuration. Optionally, a smaller number (two or more pipelines) or a larger number (more than four pipelines) may be used in such a configuration. Furthermore, the physical layout of the pipeline depicted in FIG. 3 is exemplary, and not necessarily suggestive of an actual physical layout of the cascaded, delayed execution pipeline unit.

In one embodiment, each pipeline (P0, P1, P2, and P3) in the cascaded, delayed execution pipeline configuration may contain an execution unit 94. In the example depicted in FIG. 3, pipeline P0 is the shortest delay pipeline, and pipeline P3 is the longest delay pipeline in the cascaded, delayed execution pipeline configuration. The execution unit 94 may contain several pipeline stages which perform one or more functions for a given pipeline. For example, the execution unit 94 may perform all or a portion of the fetching and decoding of an instruction. The decoding performed by the execution unit 94 may be shared with a predecoder and scheduler 63 which is shared among multiple processor cores 81 or, optionally, which is utilized by a single processor core 81. The execution unit 94 may also read data from a register file, calculate addresses, perform integer arithmetic functions (e.g., using an arithmetic logic unit, adder, shifter or ALU), perform floating point arithmetic functions, execute instruction branches, perform data access functions (e.g., loads and stores from memory), and store data back to registers (e.g., in the register file 86). In some cases, the processor core 81 may utilize an instruction fetching circuitry 89, the register file 86, cache load and store circuitry 87, and write-back circuitry 85, as well as any other circuitry, to perform these functions.

In one embodiment, each execution unit 94 may perform the same functions. Optionally, each execution unit 94 (or different groups of execution units) may perform different sets of functions. Also, in some cases the execution units 94 in each processor core 81 may be the same or different from execution units 94 provided in other cores. For example, in one core, execution units 94A and 94C may perform load/store, adder, shifter and arithmetic functions while execution units 94B, and 94D may perform only arithmetic functions.

In one embodiment, as depicted, execution in the execution units 94 may be performed in a delayed manner with respect to the other execution units 94. The depicted arrangement may also be referred to as a cascaded, delayed configuration, but the depicted layout is not necessarily indicative of an actual physical layout of the execution units. In such a configuration, where instructions (referred to, for convenience, as I0, I1, I2, I3) in an instruction group are issued in parallel to the pipelines P0, P1, P2, P3, each instruction may be executed in a delayed fashion with respect to each other instruction. For example, instruction I0 may be executed first in the execution unit 94A for pipeline P0, instruction I1 may be executed second in the execution unit 94B, for pipeline P1, and so on.

In one embodiment, upon issuing the issue group to the processor core 81, I0 may be executed immediately in execution unit 94A. Later, after instruction I0 has finished being executed in execution unit 94A, execution unit 94B, may begin executing instruction I1, and so on, such that the instructions issued in parallel to the processor core 81 are executed in a delayed manner with respect to each other.

In one embodiment, some execution units 94 may be delayed with respect to each other while other execution units 94 are not delayed with respect to each other. Where execution of a second instruction is dependent on the execution of a first instruction, forwarding paths 98 may be used to forward the result from the first instruction to the second instruction. The depicted forwarding paths 98 are merely exemplary, and the processor core 81 may contain more forwarding paths from different points in an execution unit 94 to other execution units 94 or to the same execution unit 94.

In one embodiment, instructions which are not being executed by an execution unit 94 (e.g., instructions being delayed) may be held in a delay queue 92 or a target delay queue 96. The delay queues 92 may be used to hold instructions in an instruction group which have not been executed by an execution unit 94. For example, while instruction I0 is being executed in execution unit 94A, instructions I1, I2, and I3 may be held in a delay queue 92. Once the instructions have moved through the delay queues 92, the instructions may be issued to the appropriate execution unit 94 and executed. The target delay queues 96 may be used to hold the results of instructions which have already been executed by an execution unit 94. In some cases, results in the target delay queues 96 may be forwarded to execution units 94 for processing or invalidated where appropriate. Similarly, in some circumstances, instructions in the delay queue 92 may be invalidated, as described below.

In one embodiment, after each of the instructions in an instruction group have passed through the delay queues 92, execution units 94, and target delay queues 96, the results (e.g., data, and, as described below, instructions) may be written back either to the register file 86 or the L1 I-cache 72 and/or D-cache 74. In some cases, the write-back circuitry 85 may be used to write back the most recently modified value of a register (received from one of the target delay queues 96) and discard invalidated results.

Scheduling Instructions

According to one embodiment of the invention, pipeline stalls due to cache misses may be reduced by executing load instructions in the least delayed pipeline (i.e. next available) (e.g., in the example described above, in pipeline $P_0$). Where the load instruction results in a D-cache miss, instructions issued after the load instruction may be invalidated and a request for data may be sent to the L2 cache 61. While the desired data is being fetched from the L2 cache 61, the load instruction may be reissued to the pipeline (e.g., pipeline P3) with the greatest delay in execution, and the invalidated instructions may be issued, either in the same issue group with the reissued instruction or in subsequent issue groups.

Executing the load instruction as described above may be beneficial in at least three respects. First, by initially executing the load instruction in the pipeline with the least delay in execution (i.e. next available), a determination may be made quickly of whether the load instruction results in a D-cache miss. With an early determination of whether a D-cache miss results, fewer instructions issued to the pipeline (e.g., instructions in subsequent issue groups) may be invalidated and reissued. Second, by quickly determining whether the issued instruction results in an L1 cache miss, an L2 cache access may be initiated more quickly, thereby reducing any resulting stall in the pipeline while the L2 cache access is performed. Third, by reissuing the load instruction to the pipeline with the greatest delay, more time (e.g., while the load instruction is being moved through the delay queue 92 and before the instruction is re-executed by an execution unit 94) may be provided for the L2 cache access of the desired data to be completed, thereby preventing a stall of the processor core 81.

FIG. 4 is a block diagram depicting an instruction prioritization circuitry 83 according to one embodiment of the invention. The instruction prioritization circuitry 83 enables optimizations which may be achieved from the reordering of instructions as described in greater detail below with regard to FIG. 5. The instruction prioritization circuitry 83 can implement any number of different instruction optimization schemes including, but not limited to, prioritizing the instructions according to the priority order of the class type. A second order prioritization can be implemented to resolve instances where instructions are prioritized to the same pipeline. In one embodiment of the present invention, the second order prioritization occurs on a first-come first-served manner.

An I-line buffer 82 may be used to store instructions fetched from the L1 I-cache 72. An I-line buffer 82 transfers the instructions to the instruction prioritization circuitry 83 for optimizations. Optimizations may be achieved from the ordering of instructions in any number of different instruction optimization schemes, including the one of the present invention, which is to utilize both a first level and second-level prioritization scheme for instructions.

After receiving the instructions from the I-line buffer 82 the instruction prioritization circuitry 83 loads each instruction into a corresponding preliminary pipeline 101. Illustrated in FIG. 4 are eight pipelines P0 through P7 for example purposes only, however, it is understood that any number of instruction pipelines can be utilized. Each preliminary pipeline 101 includes the full instruction as well as the instruction opcode. The instruction information is then transferred through switching system 102 into multiplexer bank 103.

The opcode for each instruction in each pipeline is also transferred via busline 106 into the class conflict detection logic 104. The class conflict detection logic 104 determines if any of the instruction opcodes would resolve to the same instruction pipeline and informs the class selection logic 105 of any conflicts or collisions. The class selection logic 105 then utilizes the multiplexer bank 103 to reorder the instructions into the first reorder pipelines 109.

The first reorder pipelines 109 enable the instruction prioritization circuitry 83 to organize the higher priority instructions into the lower order or least delayed pipelines. In the illustrated example, the load instructions are prioritized first using dependent change depth. The dependent change depth priority is based upon how many dependent loads will follow this load instruction.

The instruction information is then transferred through switching system 112 into multiplexer bank 113. The opcode for each instruction in each pipeline is also transferred via busline 116 into the same class conflict detection logic 114. The same class conflict detection logic 114 determines if any of the instruction opcodes would resolve to the same instruction pipeline and informs the same class selection logic 115 of any conflicts or collisions. The class selection logic 115 then utilizes the multiplexer bank 113 to reorder the instructions into the second reorder pipelines 119. In the illustrated example, the load instructions are prioritized a second time using a first-come first-served manner and schedule the instructions accordingly. The re-ordered instruction group in the second reorder pipelines 119 is then transferred into the issue and dispatch circuitry 84.

Issue and dispatch circuitry 84 may be used to group instructions retrieved from the instruction prioritization circuitry 83 into instruction groups which may then be issued to the processor core 81.

Figure 5B:
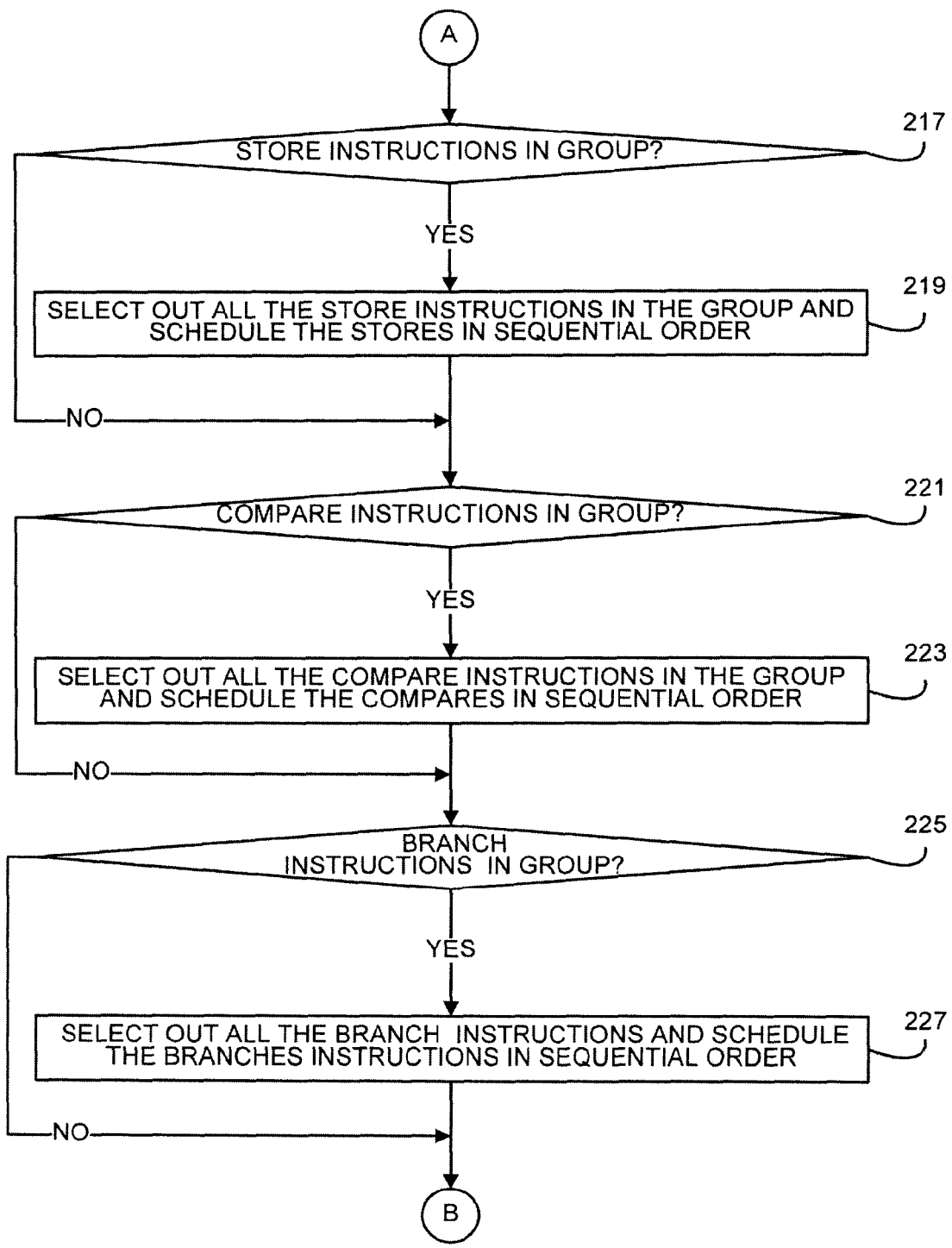
Figure 5C:
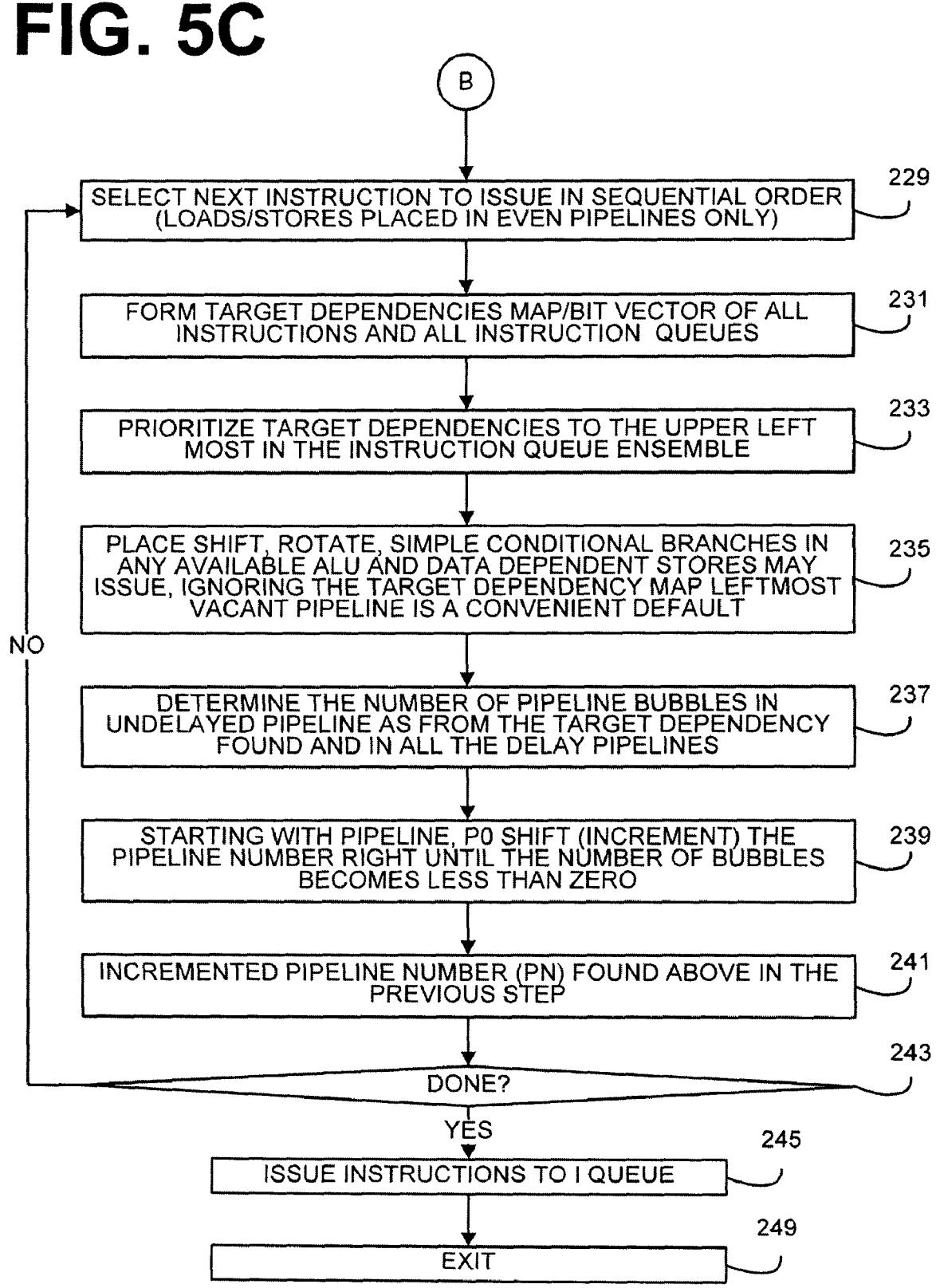

FIGS. 5A-C are flow charts illustrating an example of the operation of a group priority issue process 200 for executing instructions in the delayed execution pipeline according to one embodiment of the invention. The instruction optimization includes, but is not limited to, prioritizing the instructions according to the priority order of the class type. A second order prioritization can be implemented to resolve instances were instructions are prioritized to the same pipeline. In one embodiment of the present invention, the second order prioritization occurs on a first-come first-served manner.

First at step 201, the group priority issue process 200 receives a group of instructions that are to be executed as a group. At step 203, all of the instructions in the group were evaluated to determine what type of instructions are within the instruction group. The basic types of instruction groups include loads, floating point, rotate, shift, ALU, stores, compares and branches. In one embodiment, these instructions in the instruction groups are prioritized in the following order: (1) loads, (2) floating-point/multiply/shift/rotate, (3) ALU, (4) store, (5) compares and (6) branches.

At step 205, it is determined if one or more load instructions are present in the instruction group. If the received instructions do not contain any load instructions, then the group priority issue process skips to step 209. If there are one or more load instructions in the instruction group the load instructions are selected out of all the instructions in the group, and all of the loads selected out of the group are prioritized in a first-come first-served manner at step 207. Utilizing this process the first load encountered is scheduled, the second load encountered is scheduled next and so on. In one embodiment, loads instructions are scheduled first as they are the most time critical instructions in processor operation. If they are not properly scheduled, they can cause the greatest execution delay or processor stalls.

At step 209, it is determined if there are any floating-point, multiply, rotate or shift instructions in the group. If it is determined to step 209 that that none of these instructions exist in the group, then the group priority issue process skips to step 223. However, if it is determined that one or more of floating-point, multiply, rotate or shift instructions exist then they are selected out of the group and are prioritized in a first-come first-served manner at step 211. Utilizing this process be first of these instructions encountered is scheduled first, the second of these instructions encountered is scheduled next and so on.

At step 223, it is determined if there are any ALU instructions in the group. If it is determined at step 223 that no ALU instructions exist, then the group priority issue process skips to step 217. However, if it is determined that one or more ALU instructions do exist in the group, then they are selected out of group and are prioritized in a first-come first-served manner at step 215. Utilizing this process the first of these ALU instructions encountered is scheduled, the second of these instructions encountered is scheduled next and so on.

At step 217, it is determined if any store instructions are in the group. If it is determined at step 217 that no store instructions exist, then the group priority issue process skips to step 221. However, if it is determined at step 217 that one or more store instructions exists, then they are selected out of a group of instructions and are prioritized in a first-come first-served manner at step 219. Utilizing this process the first of these store instructions encountered is scheduled, the second of these store instructions encountered is scheduled next and so on.

At step 221, it is determined if any compare instructions are in the group. If it is determined at step 221 that no compare instructions exist, then the group priority issue process skips to step 225. However, if it is determined at step 221 that one or more compare instructions exists, then they are selected out of a group of instructions and are prioritized in a first-come first-served manner at step 223. Utilizing this process the first of these compare instructions encountered is scheduled, the second of these compare instructions encountered is scheduled next and so on.

At step 225, it is determined if any branch instructions are in the group. If it is determined at step 225 that no branch instructions exist, then the group priority issue process skips to step 229. However, if it is determined at step 225 that one or more branch instruction exists, then they are selected out of a group of instructions and are prioritized in a first-come first-served manner at step 227. Utilizing this process the first of these branch instructions encountered is scheduled, the second of these instructions encountered is scheduled next and so on.

At step 229, the group priority issue process selects the next instruction in the group to be issued in sequential order. In one embodiment architecture, the loads and stores are placed in even pipelines only. In step 231, target dependencies are formed and the map/bit vector of all instructions and all instructions queues. At step 233, the targeted dependencies are prioritized in the upper left most of the instruction queue ensemble.

At step 235 any shift, rotate, simple conditional branches are scheduled in any available ALU and data dependent stores may issue. At step 237 the number of pipeline bubbles in undelayed pipelines as from the target dependency are found and in all the delayed pipelines. At step 239, starting with P0 pipeline, there is a shift (i.e. incremented) of the pipeline number to the right until the number of bubbles becomes less than zero. The pipeline number found above at step 239 is incremented at step 241. At step 243, the group priority issue process 200 determines if there are more instructions to be placed in the pipelines. If it is determined at step 243 that there are more instructions to be placed in the pipeline, then the group priority issue process 200 returns to repeat steps 229 through 243. However, it is determined at step 243 that there are no more instructions to be placed in the pipelines, then the group priority issue process 200 executes the instructions at step 243 and then exits at step 249.

The present invention can take the form of an entirely hardware embodiment, an entirely software embodiment or an embodiment containing both hardware and software elements. As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A method of scheduling execution of an instruction in a processor having at least one cascaded delayed execution pipeline unit having four or more execution pipelines that execute instructions in a common issue group in a delayed manner relative to each other, the method comprising:
   receiving an issue group of instructions;
   implementing a first prioritization scheme for the issue group of instructions using a class type priority by prioritizing classes of instructions in the order of, from highest to lowest priority: load instructions, floating point instructions, ALU instructions, store instructions, compare instructions, branch instructions, and remaining instructions;
   determining if at least one load instruction is in the issue group and, if so, scheduling the at least one load instruction in a first available pipeline;
   determining if at least one floating point instruction is in the issue group and, if so, scheduling the floating point instruction in a next available pipeline following the determination of at least one load instruction;
   determining if at least one ALU instruction is in the issue group and, if so, scheduling the at least one ALU instruction in a next available pipeline following the determination of at least one floating point instruction;
   implementing a second prioritization scheme for each class of instructions resulting from the first prioritization scheme, in the priority order of the first prioritization scheme, the second prioritization scheme comprising scheduling multiple instructions of the class in a sequential order;
   forming target dependencies of all instructions and instruction queues;
   prioritizing the target dependencies in an upper left most of an instruction queue ensemble;
   determining a number of pipeline bubbles in undelayed pipelines as from the target dependencies;
   shifting a pipeline number right until the number of pipeline bubbles becomes less than zero; and
   executing the issue group of instructions in the cascaded delayed execution pipeline unit.

2. The method of claim 1, wherein the first prioritization scheme further comprises:
   determining if at least one store instruction is in the issue group and, if so scheduling the least one store instruction next in a next available pipeline following the determination of at least one floating point instruction.

3. The method of claim 2, wherein the first prioritization scheme further comprises:
   determining if at least one compare instruction is in the issue group and, if so, scheduling the at least one compare instruction in a next available pipeline following the determination of at least one store instruction.

4. The method of claim 3, wherein the first prioritization scheme further comprises:
   determining if at least one branch instruction is in the issue group and, if so, scheduling the least one branch instruction in a next available pipeline following the determination of at least one compare instruction.

5. The method of claim 4, wherein the first prioritization scheme further comprises:
   determining if at least one adder instruction is in the issue group and, if so, scheduling the least one adder instruction in an adder pipeline.

6. The method of claim 4, wherein the first prioritization scheme further comprises:
   determining if at least one shifter instruction is in the issue group and, if so, scheduling the least one shifter instruction in a shifter pipeline.

7. The method of claim 4, wherein any instructions unscheduled in the issue group instructions are scheduled in any of the remaining execution pipelines.

8. An integrated circuit device comprising:
   a cascaded delayed execution pipeline unit having four or more execution pipelines that execute instructions in a common issue group in a delayed manner relative to each other;

circuitry configured to:
  receive an issue group of instructions;
  implement a first prioritization scheme for the issue group of instructions using a class type priority by prioritizing classes of instructions in the order of, from highest to lowest priority: load instructions, floating point instructions, ALU instructions, store instructions, compare instructions, branch instructions, and remaining instructions;
  determine if at least one load instruction is in the issue group and, if so schedule the at least one load instruction in a first available pipeline;
  determine if at least one floating point instruction is in the issue group and, if so, schedule the floating point instruction in a next available pipeline following the determination of at least one load instruction;
  determine if at least one ALU instruction is in the issue group and, if so, schedule the at least one ALU instruction in a next available pipeline following the determination of at least one floating point instruction;
  implement a second prioritization scheme for each class of instructions resulting from the first prioritization scheme, in the priority order of the first prioritization scheme, the second prioritization scheme comprising scheduling multiple instructions of the class in a sequential order;
  form target dependencies of all instructions and instruction queues;
  prioritize the target dependencies in an upper left most of an instruction queue ensemble;
  determine a number of pipeline bubbles in undelayed pipelines as from the target dependencies;
  shift a pipeline number right until the number of pipeline bubbles becomes less than zero; and
  execute the issue group of instructions in the cascaded delayed execution pipeline unit.

9. The integrated circuit device of claim 8, wherein the circuitry is further configured to:
  determine if at least one store instruction is in the issue group and, if so, schedule the least one store instruction next in a next available pipeline following the determination of at least one ALU instruction.

10. The integrated circuit device of claim 9, wherein the circuitry is further configured to:
  determine if at least one compare instruction is in the issue group and, if so, schedule the at least one compare instruction in a next available pipeline following the determination of at least one store instruction.

11. The integrated circuit device of claim 10, wherein the circuitry is further configured to:
  determine if at least one branch instruction is in the issue group and, if so, schedule the least one branch instruction next in a next available pipeline following the determination of at least one compare instruction.

12. The integrated circuit device of claim 11, wherein the circuitry is further configured to:
  determine if at least one adder instruction is in the issue group and, if so scheduling the least one adder instruction in an adder pipeline.

13. The integrated circuit device of claim 11, wherein the circuitry is further configured to:
  determine if at least one shifter instruction is in the issue group and, if so schedule the least one shifter instruction in a shifter pipeline.

14. The integrated circuit device of claim 11, wherein the circuitry is further configured to:
  schedule any instructions unscheduled in the issue group instructions in any of the remaining execution pipelines.

15. A processor comprising:
  a cascaded delayed execution pipeline unit having four or more execution pipelines that execute instructions in a common issue group in a delayed manner relative to each other;
  circuitry configured to:
    receive an issue group of instructions;
    implementing a first prioritization scheme for the issue group of instructions using a class type priority by prioritizing classes of instructions in the order of, from highest to lowest priority: load instructions, floating point instructions, ALU instructions, store instructions, compare instructions, branch instructions, and remaining instructions;
    determine if at least one load instruction is in the issue group and, if so, schedule the at least one load instruction in a first available pipeline;
    determine if at least one floating point instruction is in the issue group and, if so, schedule the floating point instruction in a next available pipeline following the determination of at least one load instruction;
    determine if at least one ALU instruction is in the issue group and, if so, schedule the at least one ALU instruction in a next available pipeline following the determination of at least one floating point instruction;
    implement a second prioritization scheme for each class of instructions resulting from the first prioritization scheme, in the priority order of the first prioritization scheme, the second prioritization scheme comprising scheduling multiple instructions of the class in a sequential order;
    form target dependencies of all instructions and instruction queues;
    prioritize the target dependencies in an upper left most of an instruction queue ensemble;
    determine a number of pipeline bubbles in undelayed pipelines as from the target dependencies;
    shift a pipeline number right until the number of pipeline bubbles becomes less than zero; and
    execute the issue group of instructions in the cascaded delayed execution pipeline unit.

16. The processor of claim 15, wherein the circuitry is further configured to:
  determine if at least one store instruction is in the issue group and, if so, schedule the least one store instruction next in a next available pipeline following the determination of at least one ALU instruction; and
  determine if at least one compare instruction is in the issue group and, if so, schedule the at least one compare instruction in a next available pipeline following the determination of at least one store instruction.

17. The processor of claim 16, wherein the circuitry is further configured to:
  determine if at least one branch instruction is in the issue group and, if so, schedule the least one branch instruction in a next available pipeline following the determination of at least one store instruction.

18. The processor of claim 17, wherein the circuitry is further configured to:
  determine if at least one store instruction is in the issue group and, if so, schedule the least one store instruction in a next available pipeline following the determination of at least one branch instruction.

19. The processor of claim 18, wherein the circuitry is further configured to:
   determine if at least one adder instruction is in the issue group and, if so, schedule the least one adder instruction in an adder pipeline following the determination of at least one store instruction.

20. The processor of claim 18, wherein the circuitry is further configured to:
   schedule any instructions unscheduled in the issue group instructions in any of the remaining execution pipelines.

* * * * *